(12) United States Patent
Imielinski

(10) Patent No.: US 11,580,118 B2
(45) Date of Patent: Feb. 14, 2023

(54) DATA EXPLORATION AS SEARCH OVER AUTOMATED PRE-GENERATED PLOT OBJECTS

(71) Applicant: Rutgers, The State University of New Jersey, New Brunswick, NJ (US)

(72) Inventor: Tomasz Imielinski, Princeton, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 0 days.

(21) Appl. No.: 17/258,673

(22) PCT Filed: Jul. 8, 2019

(86) PCT No.: PCT/US2019/040808
§ 371 (c)(1),
(2) Date: Jan. 7, 2021

(87) PCT Pub. No.: WO2020/014124
PCT Pub. Date: Jan. 16, 2020

(65) Prior Publication Data
US 2021/0271683 A1 Sep. 2, 2021

Related U.S. Application Data

(60) Provisional application No. 62/695,641, filed on Jul. 9, 2018.

(51) Int. Cl.
*G06F 16/24* (2019.01)
*G06F 16/2457* (2019.01)

(52) U.S. Cl.
CPC .............. *G06F 16/24578* (2019.01)

(58) Field of Classification Search
CPC ........... G06F 16/24578; G06F 16/9038; G06F 16/248; G06F 16/245
See application file for complete search history.

(56) References Cited

U.S. PATENT DOCUMENTS 6,121,969 A 9/2000 Jain et al.
7,523,106 B2 4/2009 Russell et al.
(Continued)

OTHER PUBLICATIONS

International Search Report and Written Opinion issued in PCT Application No. US/2019/040808, dated Oct. 8, 2019, 10 pages.
(Continued)

*Primary Examiner* — Alicia M Willoughby
(74) *Attorney, Agent, or Firm* — Talem IP Law, LLP

(57) ABSTRACT

Data exploration as search over automated pre-generated plot objects can include data analytics systems with automated data mining and simplified user experience front ends. A computer-implemented method, that can be performed by the described data analytics systems, includes receiving a request for plots or plot types of a specified criteria; searching a plot object resource for plots relevant to the specified criteria, the plot object resource comprising an indexed repository of available plots; sorting and ranking the plots or plot types according to associated scores, the associated scores for each plot being based on information theoretic metrics relevant to a measure of interest; and providing plots satisfying a criteria of the sorting and the ranking to a source of the request.

25 Claims, 9 Drawing Sheets

(56) References Cited

U.S. PATENT DOCUMENTS

| | | | |
|---|---|---|---|
| 8,301,585 B2* | 10/2012 | Mourey | G09B 29/00 |
| | | | 707/603 |
| 9,299,173 B2 | 3/2016 | Rope et al. | |
| 10,997,190 B2* | 5/2021 | Porath | G06F 9/542 |
| 2003/0115188 A1 | 6/2003 | Srinivasa et al. | |
| 2007/0240050 A1 | 10/2007 | Quinn-Jacobs | |
| 2009/0287673 A1* | 11/2009 | Chronister | G06F 16/904 |
| 2015/0006518 A1* | 1/2015 | Baumgartner | G06F 16/338 |
| | | | 707/723 |
| 2015/0186806 A1* | 7/2015 | Hiltz-Laforge | G06K 9/6215 |
| | | | 705/7.11 |
| 2015/0243059 A1* | 8/2015 | Matange | G06Q 30/00 |
| | | | 345/440 |
| 2015/0278214 A1 | 10/2015 | Anand et al. | |
| 2015/0302051 A1* | 10/2015 | Baumgartner | G06F 16/248 |
| | | | 707/754 |
| 2015/0339572 A1 | 11/2015 | Achin et al. | |
| 2016/0092408 A1* | 3/2016 | Lagerblad | G06F 3/04847 |
| | | | 715/243 |
| 2017/0124481 A1 | 5/2017 | Crabtree et al. | |
| 2017/0220633 A1* | 8/2017 | Porath | G06F 9/542 |
| 2018/0032605 A1 | 2/2018 | Deshpande et al. | |
| 2018/0189294 A1* | 7/2018 | Anand | G06F 16/24578 |
| 2020/0019546 A1* | 1/2020 | Luo | G06F 16/245 |

OTHER PUBLICATIONS

Zhu, Linhong et al. "Classifying Graphs Using Theoretical Metrics: A Study of Feasibility", Institute for Infocomm Research, Publication Online 2011, Retrieved Sep. 16, 2019, pp. 53-64, vol. 58, No. 10, Singapore, retrieved from: https://www.isi.edu/~linhong/Papers/DASFAA11.pdf.

Extended European Search Report issued in European Application No. 19834918.5, dated Feb. 18, 2022, 10 pages.

* cited by examiner plot type 1
    plot zero p10 (over entire database)
        plot p101
        plot p102
        ...
        plot p10k1   (all ordered by descending distance from p10)

plot type 2 plot zero p20 (over entire database)
        plot p201
        plot p202
        ...
        plot p20k2   (all ordered by descending distance from p20)

...

plot type n
    plot zero pn0   (over entore database)
        plot pn01
        plot pn02
        ...
        plot n20kn   (all ordered by descending distance from pn0)

FIG. 7B

DATA EXPLORATION AS SEARCH OVER AUTOMATED PRE-GENERATED PLOT OBJECTS

CROSS-REFERENCE TO RELATED APPLICATIONS

This application is the U.S. National Stage Application of International Application No. PCT/US19/40808, filed Jul. 8, 2019, which claims the benefit of U.S. Provisional Patent Application Ser. No. 62/695,641, filed Jul. 9, 2018, which are hereby incorporated by reference in their entirety.

GOVERNMENT SUPPORT

This invention was made with government support under CCF-0939370 awarded by the Center for Science and Information (CSoI) a National Science Foundation (NSF) Science and Technology Center. The Government has certain rights in the invention.

BACKGROUND

Data scientists take an enormous mass of messy data points (unstructured and structured) and use math, statistics and programming to clean, massage and organize them. Then these data scientists apply analytical expertise (such as, e.g., industry knowledge, contextual understanding, skepticism of existing assumptions) to uncover hidden solutions to business challenges. This process of uncovering hidden patterns visualized as plots, takes a tremendous amount of programming, often quite repetitive and tedious. To this end, companies hire expensive data scientists who spend a lot of time performing often tedious tasks.

BRIEF SUMMARY

Data exploration of large multidimensional data sets can be accomplished at the front end by search of a repository of pre-generated plots. Instead of requiring complex programming or tedious/repetitive user-designed plot generation, new plots can be continuously, and automatically, pre-generated on any dataset, and the process of data exploration reduced to search over the pre-generated plot repository.

A search interface can provide a simplified user experience front end that allows for specification of attributes (variables) or specific values that a user wants to find. The search terms, phrases, or natural language statement from the search interface are used to formulate queries that are searched against a resource of plot objects representing plots that were automatically generated or human authored. A plot object is a data structure used to represent the plot that incudes plot information and a score. The plot information refers to the information for the automatically generated or human authored plot (e.g., the metadata). A plot generated by the described system describes relationships in the data which satisfy some cardinality constraints. A score is assigned to a plot according to its calculated measure of interest (e.g., information theoretic metrics including relative measures between plots). A set of plot objects can be grouped according to plot type, and each plot type can be assigned its own score according to its calculated measure of interest. A plot type includes a set of plots each describing relationships of the same attributes, but over different slices of data. Thus, a plot object can describe a plot, a plot type, or both.

When the system receives a request for plots of a specified criteria from the simplified front end, the system can search a plot object resource for plots relevant to the specified criteria; sort and rank the plots or plot types according to associated scores, the associated scores for each plot or plot type being based on information theoretic metrics relevant to a measure of interest; and provide plots satisfying a criteria of the sorting and the ranking to a source of the request. The plot object resource includes an indexed repository of available plots and, optionally, plot types.

Analytical results from data can be generated through automatic processes that may continuously or contiguously execute on a large set of data. The automatic processes include generating plots from the data; scoring the plots using information theoretic metrics relevant to a measure of interest; and storing plot objects in a plot object resource. During the scoring of the plots, individual plots and even sets of plots (e.g., of the same plot type) can be analyzed. In various implementations, scores are applied at least in part according to relative measures with respect to other plots (and can be calculated according to the described information theoretic metrics). Information theoretic metrics relevant to a measure of interest refer to the techniques to identify plots that have characteristics known to be of interest to data analysts. For example, indicators of inequality (e.g., Gini coefficient) can be used to score individual plots and indicators of diversity (e.g., differences between plots within a set of plots) and stability (e.g., whether a small change in parameter value causes a small or large change in the distribution represented in a plot) can be used to score sets of plots which may be grouped according to plot type. As mentioned above, the plots and plot types can be ranked and sorted according to their scores.

Postprocessing methods on the pre-generated plots can be applied. The postprocessing can be to reduce redundancy. In some cases, the postprocessing can be to present plots which are sufficiently dissimilar to "plot zero" (the where plot zero is the plot with particular attributes for a particular plot type over the entire database) for each plot type and also dissimilar to each other. Redundancy of the plots in the results can be reduced by applying measures of distance between the plots such that plots which are sufficiently different from each other are presented. The reduction of redundant plots may be a default state such that a user would receive results from a reduced set of plots unless specifically indicating that all plots are desired.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 7B shows a list of ranked results according to an example implementation.

DETAILED DESCRIPTION

Figure 1:
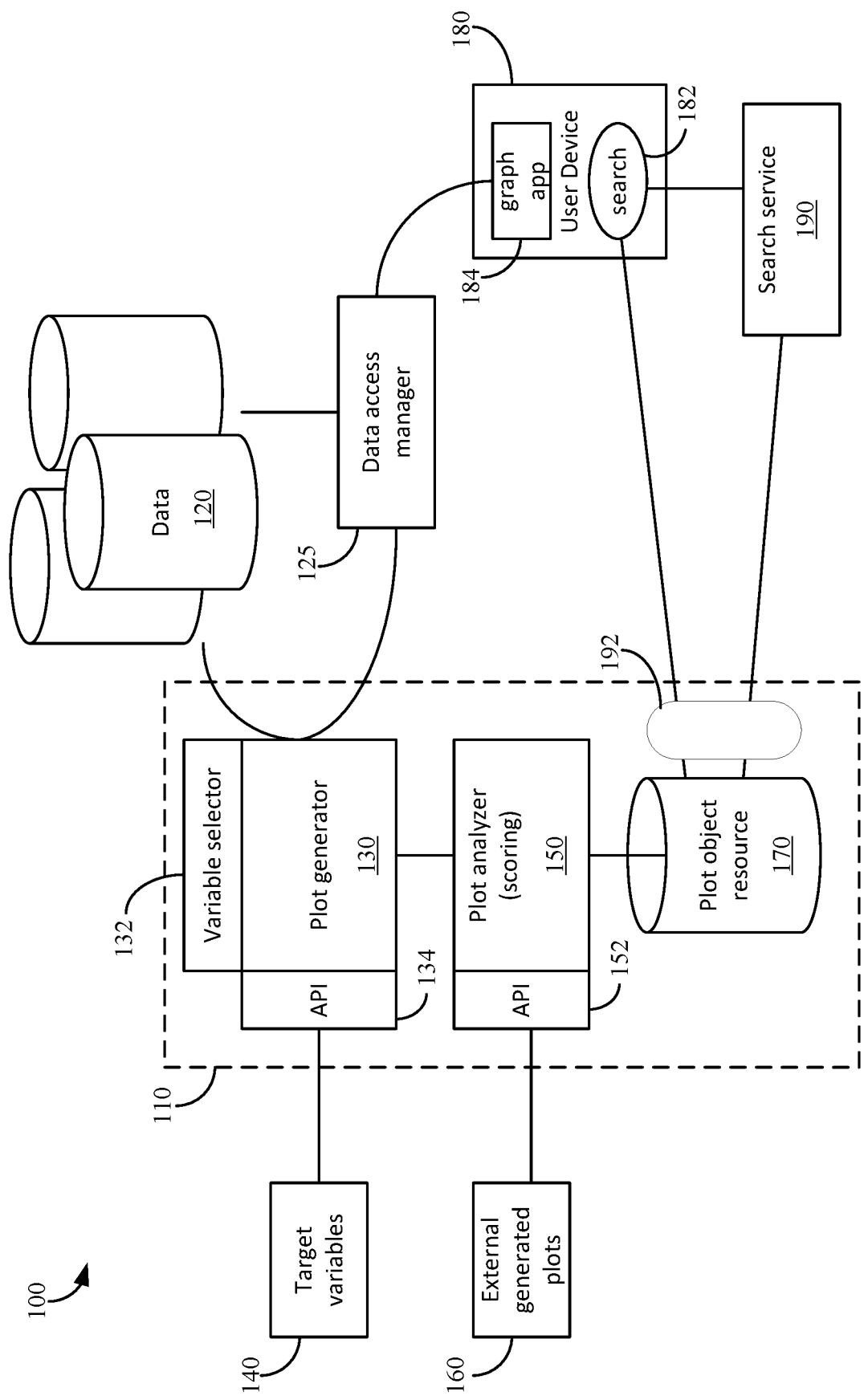
FIG. 1 illustrates an example operating environment of a data analytics system with automated data mining and simplified user experience front end.

Data exploration as search over automated pre-generated plot objects can include data analytics systems with automated data mining and simplified user experience front ends. Data mining of large multidimensional data sets can be reduced to a search problem. "Background" processes pre-generate plots from the data sets of any combination of variables, and those plots can be ranked and sorted based on certain characteristics relevant to data scientists (e.g., inequality, diversity, stability), the results of which can be searched.

The described systems and automated processes allow the replacement of tedious programming tasks performed by expensive labor (e.g., data scientists) by a search engine-like environment—when plot representations (not visualization of plots but plot objects) are pre-generated by an automated process and ranked by various measures of interestingness or spread. Then, the process of data exploration can be performed by simple search of this pre-generated database of plot objects—not requiring any programming experience from a user. Thus, the data exploration is opened to users without programming experience, and a search engine of pre-generated plots is offered as simplified experience for data mining. This dramatically reduces the labor cost of data mining and makes it open to non-programmers.

A search interface can provide a simplified user experience front end that allows for specification of attributes (variables) or specific values that a user wants to find. The search is carried out among already discovered relationships ("plots"). These pre-generated plots are relationships in the data which may satisfy some cardinality constraints, as discovered by automated plot creation (and in some case can include user-contributed plots).

A plot is a graphical representation of a distribution. Other names for plots may include charts and graphs.

Cardinality refers to the number of objects that belong to a given cube/slice of data. Cardinality constraint is usually stated as minimum support—minimum cardinality required for a cube to yield statistically significant plots.

The automatic processes include generating plots from the data (i.e. "pre-generation" of plots); scoring the plots using information theoretic metrics relevant to a measure of interest; and storing plot objects in a plot object resource. During the scoring of the plots, individual plots and even sets of plots (e.g., of the same plot type—see section entitled "Definition of Plot Type") can be analyzed. In various implementations, scores are applied at least in part according to relative measures with respect to other plots (and can be calculated according to the described information theoretic metrics). Information theoretic metrics relevant to a measure of interest refer to the techniques to identify plots that have characteristics known to be of interest to data analysts. For example, indicators of inequality (e.g., Gini coefficient) can be used to score individual plots and indicators of diversity (e.g., differences between plots within a set of plots) and stability (e.g., whether a small change in parameter value causes a small or large change in the distribution represented in a plot) can be used to score sets of plots grouped according to plot type. The plot objects can be ranked and sorted according to their scores.

The process of pre-generation of plot objects can be performed in two stages–first data is sliced into data cubes which are defined through conjunctions of attribute=value pairs (see e.g., section entitled "Parameterization by Cubes"); and then, for each data cube, plot objects are generated for different plot types. Each attribute which is not part of the cube definition and each pair of attributes which are not part of the cube definition are potential candidates to define a new plot type for this cube.

A plot object is a data structure used to represent the plot that incudes plot information and a score. The plot information refers to the information (e.g., the metadata) for the automatically generated (or in some cases human authored) plot. A score is assigned to a plot according to its calculated measure of interest. A set of plot objects can be grouped according to plot type, and each plot type can be assigned a score according to its calculated measure of interest. A plot type refers to a set of plots each describing relationships of the same attributes, but over different slices of data.

The pre-generated set of plot objects may be queried at any time. Querying and pre-generation of plots can happen asynchronously. Further, the scoring of plots and searching of a plot object resource can be performed asynchronously such that plot scores may be assigned (and even reassigned/updated) at any time. Querying does not have to follow the pre-generation of plots. Just on the contrary, the pre-generation process may happen contiguously.

For example, analytical results from data can be generated through automatic processes that may continuously or contiguously execute on a large set of data. A resource of all possible relationships in the data which satisfy some cardinality constraints can be continuously or contiguously built.

According to various implementations, searching for a particular answer to a question can be reduced to searching plots in, for example, a plot object resource. In some cases, the search is performed using standard search terms, with a possible use of some additional reserved keywords, for example, the query "alcohol vs price" could simply generate scatter plots showing the relationship between wine prices and alcohol level. For instance, such a query could return other scatter plots "alcohol vs wine" for different types of wines, different countries, and different years of production. From a user perspective it is as if the user is writing programs in natural language to generate plots instead of having to write the programs or perform individual queries to hunt for information (and if the answer is not satisfactory, having to potentially write a different program instead of submitting other queries).

FIG. 1 illustrates an example operating environment of a data analytics system with automated data mining and simplified user experience front end. Referring to FIG. 1, operating environment 100 can include a data analytics system 110 that can perform automated data mining of data stored in any accessible data resource 120. The data resource(s) 120 may be an enterprise resource, a public resource, or a private resource. Data mining may be carried out on one or more resources, including any combination of enterprise, public, and private resources as made available and/or accessible to the data analytics system. In some cases, a data access manager 125 provides access to one or more of the data resources 120. Examples of data access managers 125 include, but are not limited to, file managing applications, database management systems, customer relationship management systems, and cloud storage services.

The data analytics system 110 can include a plot generator 130, which can take variables identified by a variable selector 132, or target variables received, via an application programming interface (API) 134, from another application or service 140.

An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API is generally a set of programming instructions and standards for enabling two or more applications to communicate with each other and is commonly implemented over the Internet as a set of Hypertext Transfer Protocol (HTTP) request messages and a specified format or structure for response messages according to a REST (Representational State Transfer) or SOAP (Simple Object Access Protocol) architecture.

The system 110, including plot generator 130, can support types of plots including, but not limited to, histograms, bar graphs, scatter plots, box plots, pie charts, and mosaic plots. Prediction functions can also be supported, even if not visualized. The prediction methods to predict one attribute by the remaining attributes may be ranked by error. In some cases, the system is extensible and new types of plots can be added to a library used by the plot generator when generating the plots for the datasets. Temporal and spatial domains (e.g., space and time) plots (e.g., series plots, maps, etc.), and application verticals (e.g., sales, web analytics, etc.) can be incorporated as well.

The plot generator 130 accesses the data from the data resource(s) 120 that are associated with the variables received via the API 134 and/or identified by the variable selector 132; and generates multidimensional plots, which may be parameterized by cubes (discussed in more detail below and in the section entitled "Parameterization by cubes").

For example, the data set can be sliced into cubes and plots generated for variables within each cube. The slicing of the data set into cubes can be performed by traversing the data set breadth first or depth first. Indeed, data cubes can be generated breadth first and depth first. Data cubes can also include attributes which belong to multiple tables and aggregates of such attributes. The attributes which are used in the cube definitions do not have to be limited to attributes which are part of the data. The attributes can also include attributes derived from the data attributes but not explicitly present in the data. For example, one may define a ratio of two attributes A and B (say, wine rating and wine price) as a new derived attribute A/B. It is also possible to define new attributes as aggregations of data attributes. For example, the average price of different types of wines can be a derived attribute of a country.

The variable selector 132 may implement any suitable algorithm to identify variables for generating plots. In some cases, the variable selector 132 performs a brute force algorithm that arranges every possible combination of variables from the attributes available from the data in the data resource(s) 120. In some cases, pruning techniques are used, such as incorporating cardinality constraints or other constraints which may be user specified. In some cases, the variable selector 132 supports data slicing such as described with respect to the section entitled "Parameterization by Cubes."

The number of data cubes identified/created by the system can be exponential; and the process, if performed by brute force, would also be exponential in time and space. However, various pruning methods can be applied, including pruning by minimum support used in frequent item set mining and apriori algorithms, such as described by Agrawal, Imielinski and Swami ("Mining association rules between sets of items in large databases," Proc. of the ACM SIGMOD Conference on Management of Data, Washington, D.C., May 1993, pp 207-216), Agrawal and Srikanth ("Fast Algorithms for Mining Association Rules in Large Databases," Proc. of the 20th International Conference on Very Large Data Bases, 1994, pp 487-499), and Imielinski, Khachiyan and Abdulghani ("Cubegrades: Generalizing Association Rules," Journal of Data Mining and Knowledge Discovery, Vol. 6, Issue 3, July 2002, pp 219-257). When applying such a pruning method, only data cubes with a number of data objects exceeding minimum support are considered. And plot objects are generated only for such data cubes. Different data cube pruning methods can be used— even based on the interestingness measures of data, such as spread, Gini coefficient, etc.

The plots generated by the plot generator 130 can then be analyzed by a plot analyzer 150. In some cases, a scoring API 152 may be provided to enable externally generated plots 160 to be scored. The scoring of the plots can be accomplished using information theoretic metrics relevant to a measure of interest. In various implementations, scores are applied at least in part according to relative measures with respect to other plots. Both individual plots and groups of plots (of a plot type) can be scored. Information theoretic metrics relevant to a measure of interest refer to the techniques to identify plots that have characteristics known to be of interest to data analysts. For example, indicators of inequality (e.g., Gini coefficient) can be used to score individual plots and indicators of diversity (e.g., differences between plots within a set of plots) and stability (e.g., whether a small change in parameter value causes a small or large change in the distribution represented in a plot) can be used to score sets of plots which may be grouped according to plot type. This automatic scoring can help keep the most "interesting" plots easier to find by the searches, which can preserve computing and human resources.

In some cases, externally generated plots 160 may be assigned a score or given a weight that is different than those given to the automatically generated plots from the plot generator 130. For example, it could be determined that certain users or domains have provided the plots and therefore the plot can be assigned a higher score (which may be calculated or simply assigned a predetermined score). In some cases, a publish API (not shown) may be provided by the system 110 to enable users to add plots (converted by the system to plot objects) and/or plot objects (if already in that form) for inclusion in a plot resource such as plot object resource 170.

Scored plots can be stored in the plot object resource 170 as plot objects. The plot objects do not need to include images of the plots, rather the plot objects include information about the plots (e.g., metadata). In some cases, the plot objects can be stored in JSON (JavaScript Object Notation) format. In some cases, the plot objects can be in XML (Extensible Markup Language) format. Of course, other formats may be used, including, but not limited to, hypertext markup language (HTML)-related format such as RDFa and Microdata. A set of plot objects can be grouped according to plot type, and each plot type can be assigned a score according to its calculated measure of interest.

The plot object resource 170 can store plot objects of both automatically generated plots and those authored by humans. The plot objects can be searched and, in some cases, annotated/commented on (and such information stored back in the plot object resource 170 with the plot objects). The plot objects can be indexed. In addition, the plot objects can be ranked and sorted according to their scores.

Users can perform "data mining" without having to know how to program by using search techniques, such as implemented in web search, to search for existing plots with requested parameters. A computing device 180 can include a search application 182 for searching the plots and a graph application 184 for visualization of the plots. In some cases, the analytics system front end executed on the computing device 180 supports submission of a data set (e.g., which resource 120 that is being analyzed), a request to analyze the data set (e.g., a command), a search input (e.g., text box, audio input, or other human-machine capable interface for inputting search queries or phrases), and a search result viewer. Additional functionality for visualizing and exploring selected search results can be included.

The search application 182 can directly or via a search service 190 search the plot object resource 170 to obtain results. A plot search service 192 can provide an API through which the search of the plot object resource 170 can be carried out. Plot search service 192 can in response to receiving a request for plots of a specified criteria: search a plot object resource for plots relevant to the specified criteria, where the plot object resource has an indexed repository of available plots; sort and rank the plots and/or plot types according to associated scores; and provide plots satisfying a criteria of the sorting and the ranking to a source of the request (e.g., to the search application 182 or search service 190, or other application requesting plots).

For example, a browser application executed on the computing device 180 can be used to navigate to a search page or a local search application or feature (e.g., built-in, add-on, plug-in, etc.) of an analytics application executing on the computer device 180 can be used. The search terms, phrases, or natural language statement from the search interface are used to formulate queries that are searched against the plot object resource 170 (which can store plot objects representing plots that were automatically generated and, optionally, human authored). Example queries can include general queries in the format such as NUM vs NUM by CAT, NUM by NUM, NUM by CAT, and CAT by CAT, where NUM and CAT are attribute types (e.g., number and category). Examples of general queries in this format include "alcohol vs price by country," "wine type by country," and "price by country". Of course, additional variables or data values may be included in the query.

In some cases, plot types can be searched by including a type of plot with the general query. For example, a query can include TYPE, NUM by CAT, where TYPE is any type of plot, including, but not limited to, bar graphs, histograms, heat maps, scatterplots, and box plots, as well as other plots and combinations of plots. Plots can also be searched using specific data values. For example, "all plots about Italian wines," "All scatter plots alcohol vs price for cabernets" (wine types), etc.

Prediction methods can be requested as well, for example, with queries such as "predict price by all" and "predict price by rating and grape quality." Through a plot search, the plots can appear to be generated in response to the search while in fact the plot objects were pre-generated and stored prior to search. Prediction models such as decision tree, random forest, support vector machine (SVM), etc. applied to selected variables and with selected control variables can also be pre-generated and stored in the plot object resource 170.

In some cases, an empty "search box" can return all plots (or at least a certain number of plots, which may or may not be sorted and ranked).

In some implementations, features for filtering and/or removing certain plots from the results can be included.

The graph application 184 can be used to display and explore plots selected from the results of the search of the plot object resource 170. In some cases, the graph application 184 communicates with a data access manager 125 to access the data resources 120 storing the data needed to generate the plot identified by a selected plot object.

Figure 2A:
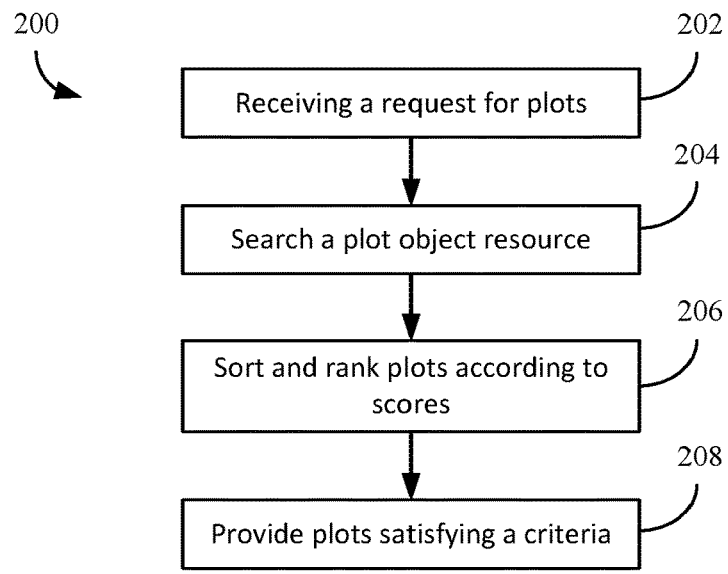
FIGS. 2A and 2B illustrate example processes that may be carried out by the analytics system.
Figure 2B:
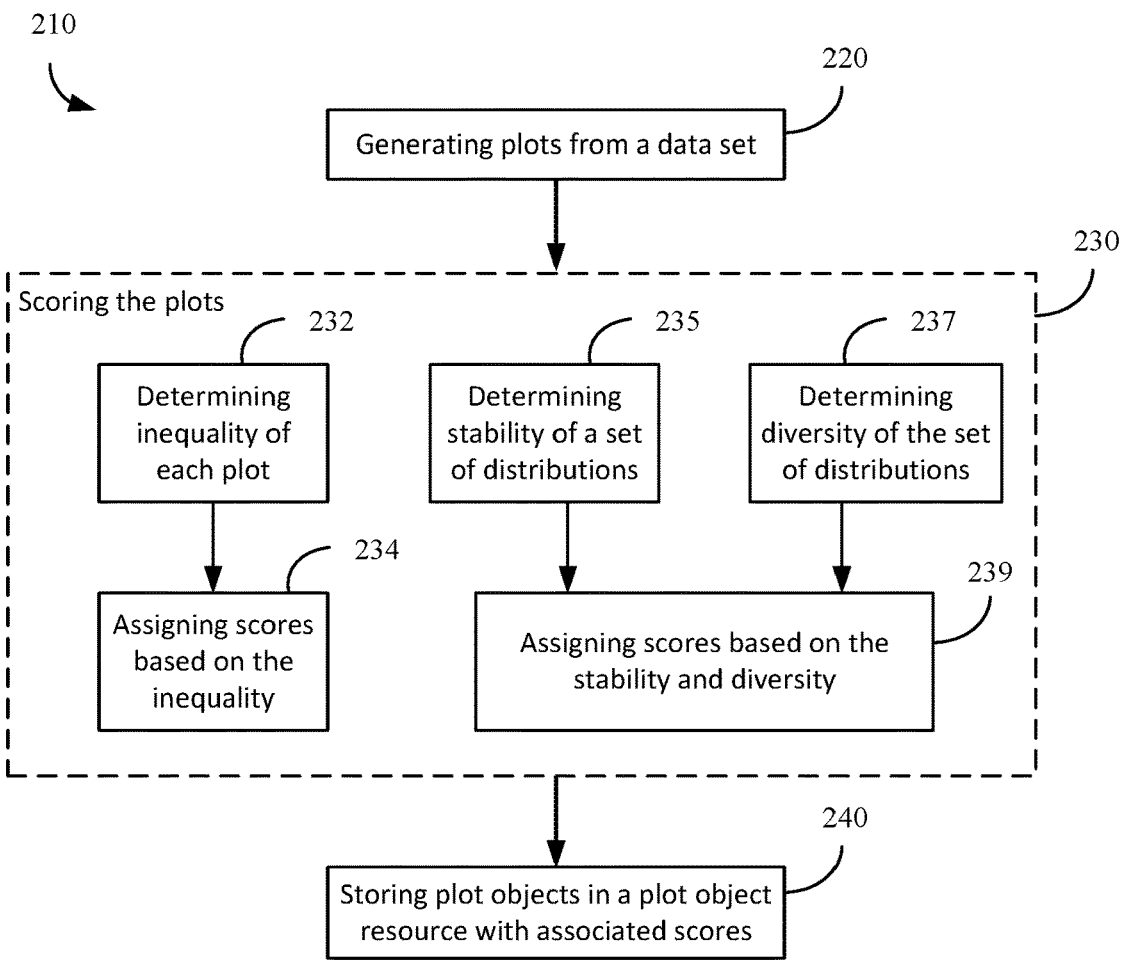

FIGS. 2A and 2B illustrate example processes that may be carried out by the analytics system. Referring to FIG. 2A, process 200 can be implemented when a request for plots of a specified criteria is received (202). The specified criteria can include attributes that a user may be interested in having plots include. The specified criteria may be in the form of a search query. Example queries can include general queries in a format, such as NUM vs NUM by CAT, NUM by CAT, and CAT by CAT, along with any desired data values (e.g., data values such as country='Italy' or wine type='Cabernet' or Year='1990'), as well as include plot types; and include prediction requests, as examples.

From the specified criteria, a plot object resource can be searched for plots relevant to the specified criteria (204). The plot object resource can include indexed plot objects that represent the plots generated or known to the analytics system. The search may include key word searches and other techniques as known in the art.

The results of the search can be sorted and ranked according to their associated scores (206). As previously mentioned, the associated scores are based on information theoretic metrics relevant to a measure of interest. Ranking may be carried out based on the score of the plots, the results of which can be seen in the example shown in FIG. 6. Certain implementations may prune or filter plots from the plot object resource before the search.

Ranking may take place in one or both categories—1) ranking plots by scores and 2) ranking plot types by scores. In ranking plots by scores, each individual plot has a score corresponding to indicators of inequality in the plot itself. In addition to, or instead of, using measures of relevancy to the query, the ranking is based on the score. Individual plots can be scored using the Gini coefficient (further explained below) and correlation, as well as other measures.

In ranking plot types by scores, for example, a plot type can be a set of plots wherein each plot in the set of plots is the same plot type (e.g., price by score) but plots the same attributes from different cubes/slices of data. Plot types can be ranked based on their relative scores. In addition, each of the plots that make up each plot type can be ranked individually within the plot type.

The sorted and ranked plots can be provided to a source of the request (208). In some cases, the number of plots and the sorting order of the plots can be based on a criteria of the sorting and the ranking such that those plots satisfying the criteria are provided. Ranking can be carried out over all plots (individually) or by plot types (e.g., ranking plot types by scores). In some cases, the criteria may include ordering the plots by highest to lowest scores or vice versa. In some cases, the criteria may include a threshold value for the scores (e.g., scores over 0.8 out of a scale of 0 to 1) or a threshold number of plots (e.g., top 10 plots). As an example, the same relationship of alumni salaries versus grade point average can differ for different majors at different universities. A search query of "Salary vs. GPA among Rutgers graduates" can return "interesting" plots that may be relevant to that query, where the "interesting" plots are those having higher scores above a specified threshold.

Referring to FIG. 2B, process 210 can be carried out continuously by the analytics system and can include generating plots from a data set (220). These plots can be considered "pre-generated" as they are automatically generated by the system and already exist before a search query is received. Bar graphs, histograms, heat maps, scatterplots, and box plots, as well as other plots or combinations of plots may be generated. The automated analytics system can slice the data into "cubes" and generate plots of the data in each cube. The "cubes" are groupings of different slices of data, which may be sliced in all possible ways and in every slice generating all possible plots (i.e., a dataset may be sliced into "cubes" and each cube can be used to generate a plurality of plots). The number of plots generated for each cube can be subject to pruning techniques to help make the plot generation more manageable (such as mentioned above with respect to variable selector 132). For example, all possible plots up to several statistical significance (e.g., by applying a minimum confidence criterion) can be generated. In some cases, univariate plots for the variables within each cube are generated. In some cases, bivariate plots for the variables within each cube are generated. In some cases, univariate and bivariate plots for the variables within each cube are generated. In yet further cases, tri- and higher variate plots may also be generated.

Process 210 can further include scoring the plots (230). In various implementations, scores are applied at least in part according to relative measures with respect to other plots. Plots of the data in each cube can be analyzed with respect to indicators of inequality. Accordingly, in some cases, scoring the plots includes scoring individual plots by determining inequality of each plot (232); and assigning scores to each plot based on the inequality (234). For example, individual plots can be scored using the Gini coefficient, correlation, as well as other measures.

In some cases, the analytics system can analyze plot types over a set of cubes and assign scores to the plot types. Scoring plot types show how the plots differ from cube to cube, making it possible to observe how the same relationship can differ for one variable over another variable. In some cases, scoring the plots includes scoring plot types by determining stability of a set of plots (235); determining diversity of the set of plots (237); and assigning scores based on the stability and diversity determinations (239).

Generated plots can be stored in a plot object resource, such as that searched in operation 204 of process 200 described with respect to FIG. 2A, with their associated scores (240).

Figure 2C:
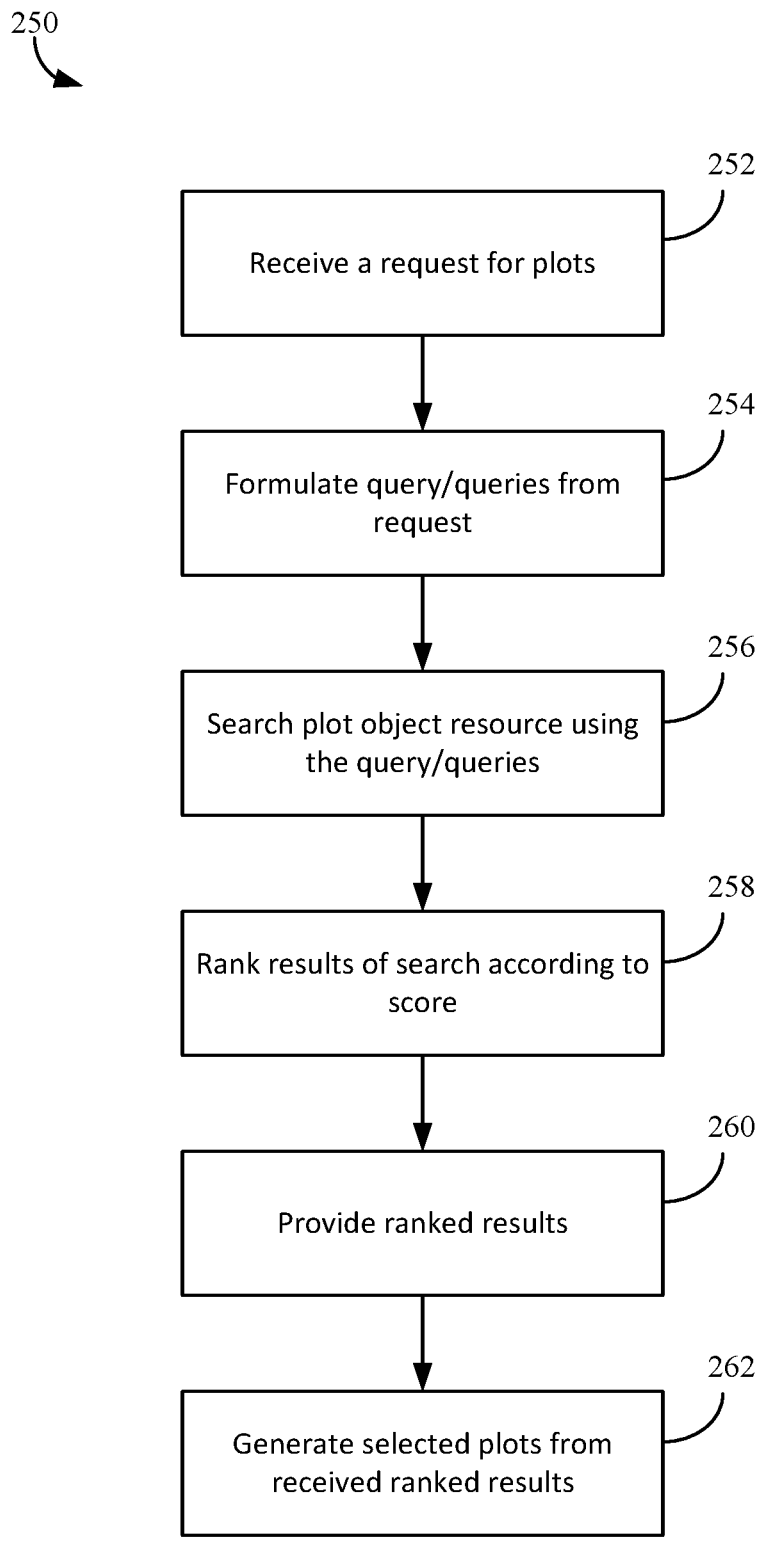
FIG. 2C illustrates an example process that may be carried out by an analytics system front end.

FIG. 2C illustrates an example process that may be carried out by an analytics system front end. More or fewer of the described operations may be carried out depending on implementation. Referring to FIG. 2C, process 250 can include receiving a request for plots from a user (252). The request for plots can be in the form of a search request, and can be received via a front end interface such as described with respect to those available for computing device 180 of FIG. 1. From the search request (e.g., search terms, phrases, or natural language statement from the search interface), one or more queries can be formulated (254). Example queries can include general queries in the format such as NUM vs NUM by CAT, NUM by CAT, and CAT by CAT, along with any desired data values (e.g., "Alcohol vs. Price in Italy," where alcohol is a NUM variable, price is a NUM variable, and Italy is a data value; or "Price of Cabernet in Italy," where price is a NUM variable, cabernet is a CAT variable, and Italy is a data value). In some cases, only a single variable may be part of the query.

The type of plot may also be included in the query. A search of the plot object resource can be carried out using one or more queries (256). The search may be accomplished through communication with a plot search application interface such as available from plot search service 192 described with respect to FIG. 1. The results—individual plots or plot types—can be ranked according to their associated scores (258). In some cases, the ranking occurs at the service. In some cases, the ranking occurs at the client (e.g., user computing device 180). In some cases, the service may rank both individual plots and plot types. In some cases, the service ranks the individual plots or the plot types, and the client application ranks the other. The ranked results can then be provided to the user (260). When a user selects a result, a visualization of the plot can be generated (262).

Advantageously, computation resource requirements can be minimized, and less memory space is required by enabling a centralized location for the data mining and the ability to share and make searchable the plot objects. The described systems can reduce the time and cost of performing data analytics.

As mentioned above, data mining uncovers relationships between measurable values. Predictive analytics determines outcomes from the measurable variables. In some implementations, the described systems perform automated data mining, leaving the predictive analytics to other software tools that take, as input, results of searches of the plot objects.

In some implementations, dramatic reduction in the cost of performing techniques used and required in performing "data science" or "data analytics" is possible. In some implementations, the described systems with automated plot generation, front-end user interface for search, and retrieval of plots including ranking, scoring, and relevance, can, in some cases, allow the same number of data scientists to do much more work and be much more effective as well as opening up data science to non-programmers.

The following examples illustrate certain implementations of processes that may be carried out by a plot generator of an analytics system such as plot generator 130 of FIG. 1.

Parameterization by Cubes

A descriptor is defined to be an attribute value pair of the form attribute=value if the attribute is discrete, i.e. categorical or ordinal, or attribute ∈ interval if the attribute is numerical (continuous). A conjunction of k descriptors is denoted as a k-conjunct.

For a given k-conjunct and a database of objects, the following definitions are given. First, the set of objects that satisfy the k-conjunct define the cube for that conjunct. Logically, a cube depicts a multidimensional view of the data. Second, the attributes that constitute the k-conjunct define the dimensions (attributes) of the cube. Third, plot of attributes (1-dimensional and 2-dimensional) over objects which satisfy the cube definition define the plots of a cube.

A cube C' is defined to be a specialization or a subcube of another cube C if the set of records in C' is a subset of the set of records in C.

As an example, the cube of French white wines is denoted by (country='France'^type='white'). The dimensions for this cube are country and type. When looking at the relationship between price and alcohol in the cube, then a plot of price vs. alcohol will be generated for this cube. A possible subcube of the cube would be (country='France'^type='white'^year ∈[1990-1999]). Note that if an m-conjunct T is a superset of an n-conjunct T' (m≥n), then the cube defined with T is a subcube for the cube described by T'.

Figure 3A:
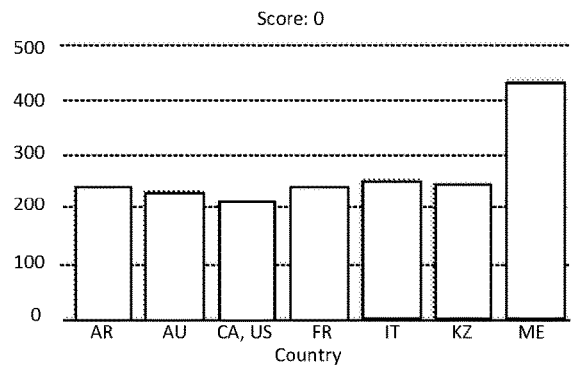
FIGS. 3A-3E illustrate plots and scores that may be generated by an automated plot generator and plot analyzer for an example cube.
Figure 3B:
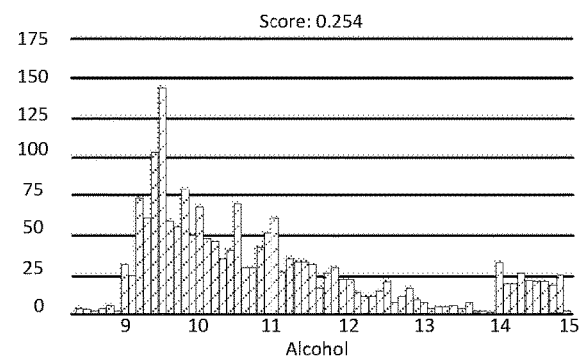
Figure 3C:
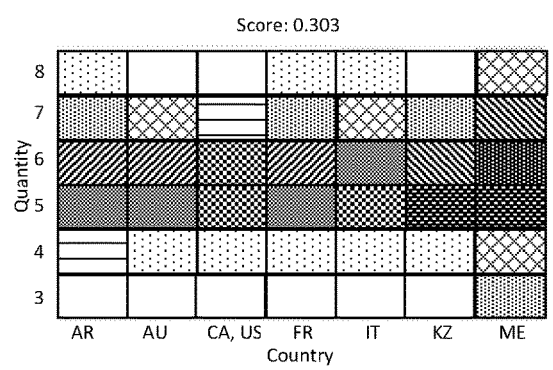
Figure 3D:
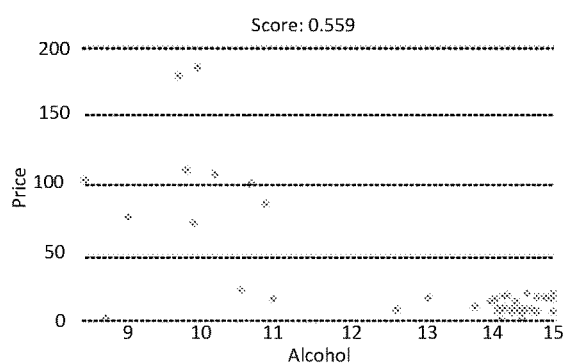
Figure 3E:
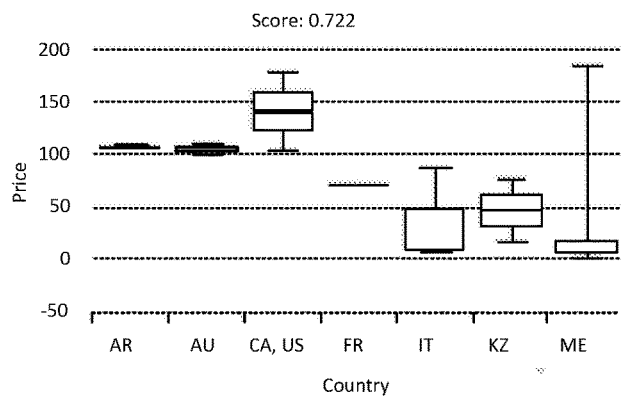

Usually, given a dataset, the categorical attributes are treated as dimensions (or the independent attributes). The plots of both the discrete and numerical attributes are of concern here. For a cube which satisfies the minimum support threshold (MINSUP), that cube is analyzed and all the possible plots for univariate and bivariate plots are generated for the cube. FIGS. 3A-3E illustrate plots and scores that may be generated by an automated plot generator and plot analyzer for an example cube. FIG. 3A illustrates a bar graph; FIG. 3B illustrates a histogram; FIG. 3C illustrates a heat map; FIG. 3D illustrates a scatterplot; and FIG. 3E illustrates side-by-side box plots.

FIGS. 3A and 3B show plots of a single attribute. Referring to FIG. 3A, a single discrete attribute (like country) is shown. The plot of a variable shows its pattern of variation, as given by the values of the variables and their frequencies. To get an idea of the pattern of variation of a discrete (i.e., categorical) variable such as country, the information can be displayed with a bar graph. Referring to FIG. 3B, a single numerical attribute (like alcohol) is shown. For those types of attributes histograms can be used. Histograms differ from bar graphs in that they represent frequencies by area and not by height. A good display will help to summarize a plot by reporting the center, spread, and shape for that variable.

FIGS. 3C-3E show plots of two attributes. Where both attributes are discrete (like quality, country), it is possible to analyze an association through a comparison of conditional probabilities and represent the data using contingency tables. Graphically, the contingency table is shown as a heatmap as in FIG. 3C. Where both attributes are numerical (like price, alcohol), it is possible to analyze how one attribute, called a response attribute, changes in relation to changes in the other attribute called an explanatory attribute. Graphically, scatterplots such as shown in FIG. 3D can be used to display the plot over two numerical attributes. Where one attribute is discrete and the other is numerical, for instance country and price, it is appropriate to use side-by-side boxplots to display any differences or similarities in the center and variability of the numerical attribute (e.g. price) across the discrete attribute (e.g. country), such as shown in FIG. 3E.

The following examples illustrate certain implementations of processes that may be carried out by a plot analyzer of an analytics system such as plot analyzer 150 of FIG. 1.

Example Plot Scoring Function

As described with respect to the plot analyzer 150 of FIG. 1, each plot can be scored and then results of a query ranked using the scores. The plots are described and scored based on their "spread." The word spread can be used as a synonym for variability. The Gini coefficient (sometimes expressed as a Gini ratio or a normalized Gini index), which is a general measure of statistical dispersion and the most commonly used measure of "inequality" or "unbalance," can be employed (see FIG. 4). The Gini coefficient measures the inequality among values of a frequency plot (for example, levels of income). The Gini coefficient is chosen over the standard deviation for it is invariant to scale and is bounded within [0, 1]. A Gini coefficient of zero expresses perfect equality, where all values are the same. A Gini coefficient of 1 (or 100%) expresses maximal inequality among values.

For a population uniform on the values $y_i$, i=1 to n, indexed in non-decreasing order ($y_i \leq y_{i+1}$):

$$G = \frac{1}{n}\left(n + 1 - 2\left(\frac{\sum_{i=1}^{n}(n+1-i)y_i}{\sum_{i=1}^{n} y_i}\right)\right)$$

This may be simplified to:

$$G = \frac{2\sum_{i=1}^{n} i y_i}{n\sum_{i=1}^{n} y_i} - \frac{n+1}{n}$$

This formula actually applies to any real population, since each person can be assigned his or her own $y_i$.

Figure 4:
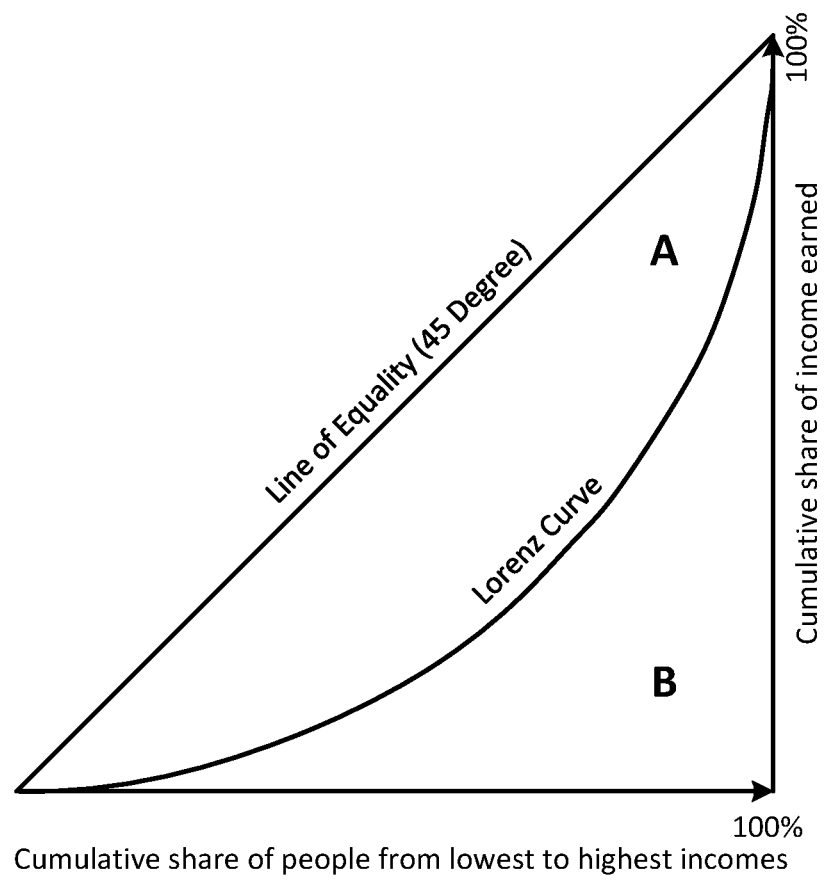
FIG. 4 shows a graph illustrating the Gini coefficient which may be applied as part of an example scoring function.
Figure 5A:
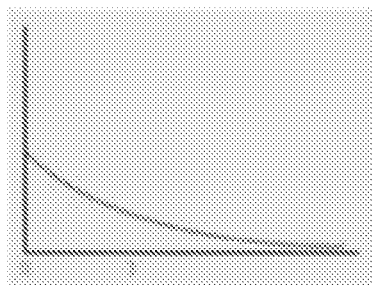
FIGS. 5A-5D show example canonical plots (clusters) of the plot type for price.
Figure 5B:
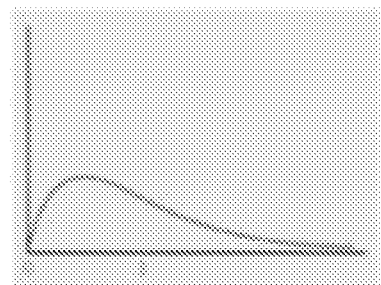
Figure 5C:
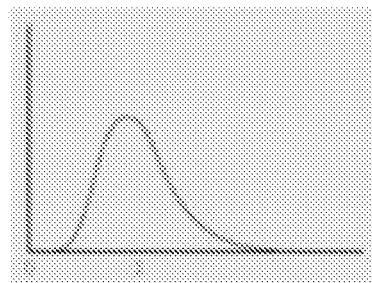
Figure 5D:
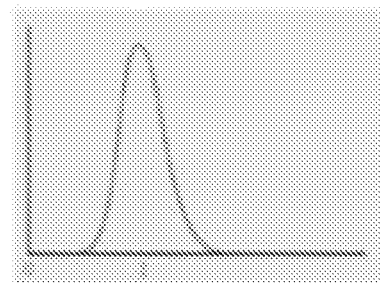

FIG. 4 shows a graph illustrating the Gini coefficient. The graph shows that the Gini coefficient is equal to the area marked A divided by the sum of the areas marked A and B, that is, Gini=A/(A+B). It is also equal to 2A and to 1-2B due to the fact that A+B=0.5 (since the axes scale from 0 to 1).

An informative simplified case just distinguishes two levels of the values of y, low and high. If the high value group is u % of the population and have a fraction f % of all the values, then the Gini coefficient is f-u. An actual more graded plot with these same values u and f will always have a higher Gini coefficient than f-u.

For the plots of single attributes (like the bar graphs and the histograms), the Gini coefficient can be calculated directly. For the plots of relationships between two attributes, the heatmap can be flattened and vectorized as a 1-dimensional bargraph, and then the Gini coefficient is calculated thereafter; in the side-by-side boxplots, the Gini coefficient can be calculated for the mutability of the five-number summary of each box.

As to the scatter plot, which uses Cartesian coordinates to display values for two variables for a set of data, strength refers to the degree of "scatter" in the plot. If the dots are widely spread, the relationship between variables is weak. If the dots are concentrated around a line, the relationship is strong. This kind of plot can be scored by measuring the strength of a linear relationship between two variables. In statistics, the Pearson correlation coefficient is a measure of the linear correlation between two variables.

$$\rho_{X,Y} = \frac{\text{cov}(X, Y)}{\sigma_X \sigma_Y} = \frac{E[(X - \mu_X)(Y - \mu_Y)]}{\sigma_X \sigma_Y},$$

where, cov(X, Y) is the covariance between X and Y, $\sigma_X$ and $\sigma_Y$ are the standard deviation of X and Y, respectively. $\mu_X$ and $\mu_Y$ are their means. E is the expectation. Standard deviation is a measure of the dispersion of data from its average.

Covariance is a measure of how two variables change together, but its magnitude is unbounded so the covariance may be difficult to interpret. By dividing covariance by the product of the two standard deviations, a normalized version of the statistic is calculated. Thus, the normalized covariance has a value between +1 and −1, where 1 is total positive linear correlation, 0 is no linear correlation, and −1 is total negative linear correlation. To make the range be [0, 1] and it an indication of the degree of correlation (strength) between two attributes (no matter positively or negatively correlated), $\rho^2$ is used as the score function for a scatter plot.

Example Information Theoretic Metrics for Scoring Plot Types

Metrics of "interestingness" or information theoretic metrics relevant to a measure of interest can address diversity and stability since both diversity and stability can be aggregate features of all possible parameterizations of a given plot type. In some cases, the more diverse and the least stable are considered to be of most interest. Of course, the scoring associated with these metrics can be based on design and/or learned relationship between human interest and diversity and stability. In some cases, the importance or relevance of (or even weights given to) diversity and/or stability can be assigned by a user.

As an illustration of the types of information that can be queried when scores based on diversity and stability are used to rank and sort plots are as follows:

Q1: How is the plot of price and alcohol affected by different countries and wine types? Example answer: it is monotonically increasing for French white wines but it is monotonically decreasing for Italian red wines.

Q2: What attributes cause the plot of price and alcohol to be unimodal? Example answer: The year is 1990s.

Q3: Which attribute influences the plot of price and alcohol the most? Example answer: Country is the crucial attribute to the plot of price and alcohol, while the year of a wine is less influential.

Q4: Which is the most interesting plot type in a given dataset? Example answer: Price is the most interesting plot type followed by the joint plot of Price and alcohol.

A plot can change depending on the set of parameters (e.g., "free variables" or attributes in cubes). Thus, plots can be parameterized and analyzed to see effects by different parameter choices. For example, instead of one plot—price and alcohol—all possible parameterizations of price vs. alcohol of wines over all possible combinations of values of the remaining attributes such as country, wine type, production year, etc., are analyzed. The analysis can focus on plot type, which refers to a subset of the set of attributes of the data set (e.g., the set of plots). In particular, plot type includes the plot of the same variable(s) over all possible cubes. Any subset X of the set of all attributes U of the data set can be a plot type. The plot type X can be parameterized over the subset of attributes of U-X, which are categorical (discrete). The examples provided herein focus on two attributes (X=2) since these plot types can be easily visualized.

Definition of a Plot Type

As mentioned above, a plot type is a set of plots. For example, given the joint plot P of two attributes $A_1$ and $A_2$, P is an example of a plot type. The remaining attributes, $A_3, \ldots, A_n$, can be thought of as parameters of plot type P.

P is instantiated over all possible cubes made from $A_3, \ldots, A_n$.

If P is a plot type, let CUBE(P) be the set of all plots of type P over all cubes. Each cube defines simply a subset of original data over where a plot of type P is observed.

Given a univariate or bivariate plot type P, P can be distributed over the cube C with n attribute-value pairs like $<f_1, p_1>, <f_2, p_2>, \ldots, <f_n, p_n>$, which can be visualized as a plot, namely, Plot(P, C).

Given a cube C, each attribute $f_i$ has its own range of values $\{f_{ij} | j=1, 2, \ldots, n_j\}$. An attribute $f_i$ can also have the value *, where * represents a "don't care" value, meaning this attribute is ignored. All attributes may be ignored as well—that there is just a cube C which includes the whole data set, not sliced by any attribute.

Plots of type P in the space of all possible values of $f_1, f_2, \ldots, f_n$ can be analyzed. The notion of distance d, between two plots of the same type P over the same attributes, i.e., $F_1(P, p_1, \ldots, p_n)$ and $F_2(P, q_1, \ldots, q_n)$, where $p_1, \ldots, p_n$ and $q_1, \ldots, q_n$ are different values of parameters $f_1, f_2, \ldots, f_n$, is defined based on some metric M:

$$d(F_1, F_2) = M(F_1, F_2) \quad (1)$$

Analysis of Plot Types

A distance matrix can be generated by calculating the distance between all pairs of plots in CUBE(P); and the distance matrix can be used to analyze the set of plots to generate a score. Any number of analysis techniques may be used, including but not limited to clustering. In some cases, the diversity of a plot type may be defined based on the clusters found in a plot type. A plot type is stable if small changes in the parameters/attributes produce only small changes in the plot; otherwise, there exists some small perturbations such that changes between the plots are large. This measure/index can be utilized to explore how the change in the parameters impact the plots.

Clustering Plots of the Same Type

There can be multiple information needs of users. The scoring function described herein (see section entitled "Example Plot Scoring Function") favors "inequality" or "correlation". However, certain times the opposite is what is sought (e.g., "uniformity"). In some cases, to address the varied needs of users, clustering algorithms can be used to quantify and diversify the plots under the visual plots from the same plot type P.

As part of performing clustering algorithms, the analytics system (and corresponding plot analyzer) can measure the distance between two plots.

The Compactness measures how closely data points (in this case, plots) are grouped in a cluster. Grouped points in the cluster are supposed to be related to each other, by sharing a common feature which reflects a meaningful pattern in practice. Compactness is normally based on distances between in-cluster points. A popular way of calculating the compactness is through variance, i.e., average distance to the mean, to estimate how objects are bonded together with its mean as its center. A small variance indicates a high compactness.

The Separation measures how different the found clusters are from each other. Users of clustering algorithms are generally not interested in similar or vague patterns when clusters are not well separated. A distinct cluster that is far from the others corresponds to a unique pattern. Similar to the compactness, the distances between objects are widely used to measure separation, e.g., pairwise distances between cluster centers, or pairwise minimum distances between objects in different clusters. Separation is an inter-cluster criterion in the sense of relation between clusters.

Figure 6:
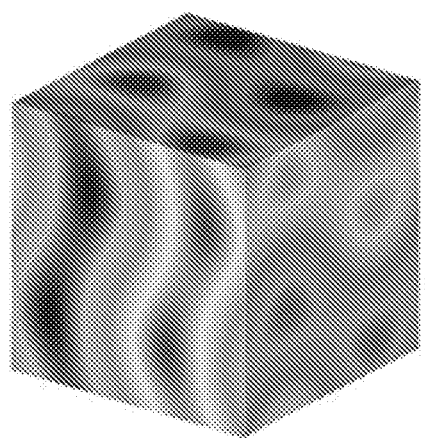
FIG. 6 shows a 2-D heatmap for a bivariate plot across an example cube.

When an interesting plot type is identified with large diversity or simply because a user is interested in a certain type of plot, the user might be more interested to explore how the plot varies within the plot type (e.g., answers to questions Q1-Q3: How is the plot of price vs alcohol affected by different countries and wine types? What attributes cause the plot of price and alcohol to be unimodal? Which attribute influences the plot of price and alcohol the most?). Visually, the plots of a plot type can be presented in three ways to help the user explore this type. FIGS. 5A-5D show example canonical plots (clusters) of the plot type for price; FIG. 6 shows a 2-D heatmap for a bivariate plot across an example cube; and FIG. 7 shows the ranking of the plots of price by score.

In one case, the plot types can be presented by clusters (canonical plots): the cluster centers (termed as canonical plots—i.e., the most "typical" plots for a given cluster) from the clustering of all plots of a plot type can help the user identify how diverse the plot type is and what are the typical patterns for the plot type. In FIGS. 5A-5D, an example is shown for the plot type of price with four clusters. These four price histograms represent 4 clusters in this plot type as the most typical for each cluster In another case, the plot type can be presented by dimension (cube): users can explore how a plot within the plot type is affected by specializing (rolldown), generalizing (rollup) and mutating (a change in the cube's dimensions) across the cube, such as shown by the heatmap of FIG. 6. The effects of different cube attributes can be clearly verified.

Figure 7A:
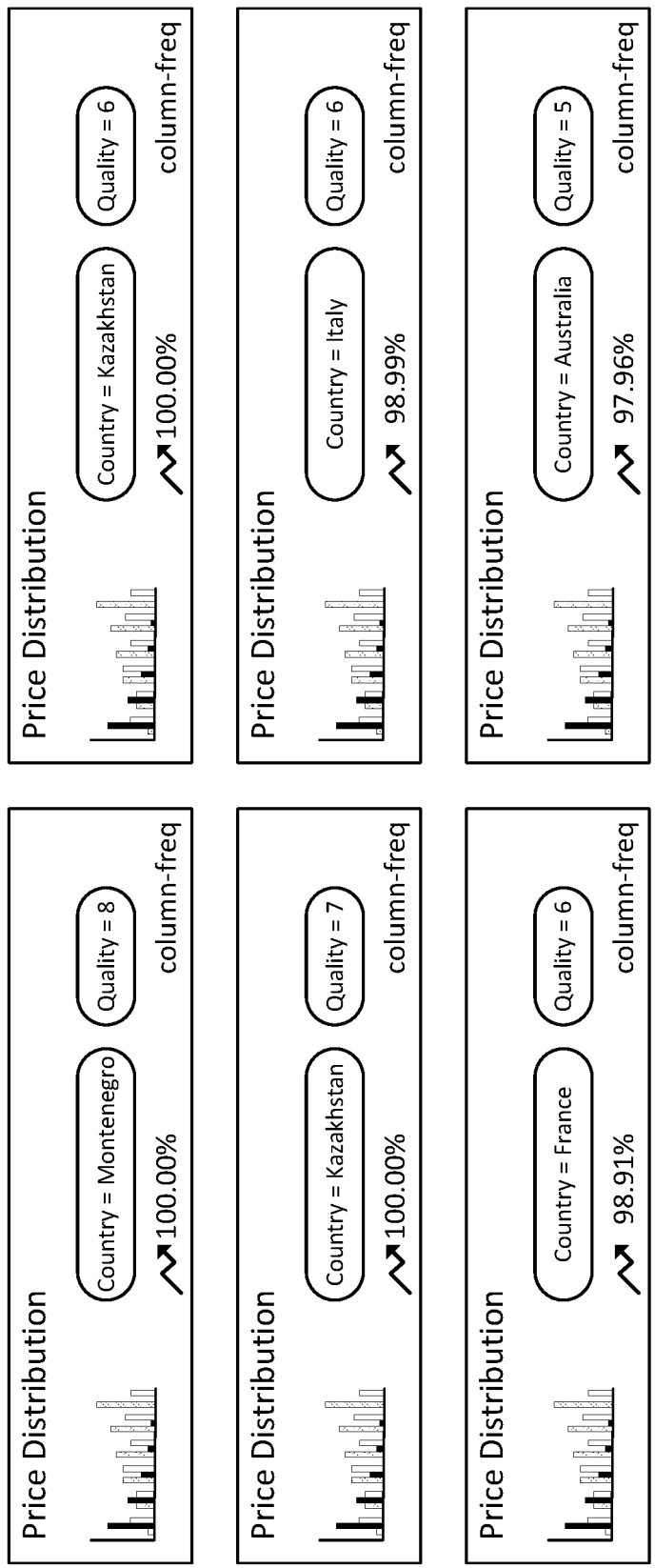
FIG. 7A shows the ranking of the plots of price by score according to an example implementation.

In yet another case, the plots can be presented by score of plots: as shown in FIG. 7 (which shows descending scores) and described in the section entitled plot scoring function, a score can be defined for each plot based on its spread. Then, it is possible to explore all plots for a plot type by ranking them based on this score, just like a search engine ranks the query results.

Example Plot Scoring

A score can be applied to a plot that is not a function of a single plot, but rather a function of distance between two plots.

Plots that can be considered outliers ("outlier plots") can be scored to provide a higher ranking. The outlier plots can include plots that display a lack of statistical correlation as such plots may actually be interesting to a data analyst. For example, a plot showing that salary is growing linearly with the number of years of education may not be interesting (as it is an expected relationship). However, if some slices of generated plots show no dependency by salary on years of education, those plots may be found more interesting because they do not align with expectations (e.g., real estate agents may have salaries that have no relation to years of education). Instead of attempting to model human expectations for every type of plot, measures indicating relationships between plots can be used to generate the scores.

For each plot(graph) type (defined as plot and attributes involved, for example scatter plot(Salary, Education_Years), calculations can be performed to see if plots over data slices "differ" much from the plot derived from the entire database. Here, the plot over entire database (all observations) can be considered to model according to "expectations". Thus, narrowing, slicing the database into smaller pieces can be used to determine if there is something that would contradict expectations. Plots that do differ from the all observations plot can be scored/weighted in a manner that can bring those "outlier" plots to the user's attention.

For instance, assuming attributes like "profession" and "state", the scatter plot(Salary, Education_Years) for Profession='Real Estate Agent' and State='NJ' may be very different than the plot scatter plot(Salary, Education_Years) on entire database.

There are different possible measures to measure the difference. In some more simpler cases, Euclidean distance can be used. In some more complex cases, the EMD (Earth Moved Distance) approach can be used (such as that described above with respect to distance between distributions).

Scores can be assigned for how "far away" a plot is from the plot "zero" for any given plot type, where plot zero is the plot for this plot type over the entire database. These "specialized" plots (e.g., plots over slices) can be ranked from the most distant to the least distant assuming certain threshold (e.g., if all plot specializations over all slices are NOT distant—meaning they are similar—it would be very redundant to list all of them).

Accordingly, redundant plots can be reduced such that the plots provided to satisfy the criteria of the sorting and ranking (e.g., in response to a request for plots or plot types of a specified criteria) can minimize the number of plots that would be considered redundant. The reducing of the redundancy of the plots can be carried out by applying measures of distance between plots such that similar plots are scored lower than plots that are more different. In some cases, this can be accomplished by applying measures of distance between each plot and other plots such that similar plots are scored lower than plots that are more different. This "post-processing" operation may be carried out during the scoring of the plots and may not be tied to any request for plots or plot types of specified criteria.

In some cases, the reducing of the redundancy of the plots can be carried out by applying measures of distance between plots such that similar plots are scored lower than plots that are more different by applying measures of distance between the plot and a plot zero. The plot can be a plot of a same type as plot zero, but over a particular cube of data. Similar to that described above, this "postprocessing" operation may be carried out during the scoring of the plots and may not be tied to any request for plots or plot types of specified criteria.

FIG. 7B shows a list of ranked results according to an example implementation. As illustrated in FIG. 7B, in some implementations, all plots (down to slices above minimum support as before) can be available, but given a search query, the highest scored plot types will be provided (e.g., the plots over the maximal slice based on the conditions listed in the query), with the plot zero for each plot type being provided. Then, for each such "plot zero," "specialized plots" can be provided. In some cases, the specialized plots are displayed in an expanded view (e.g., if a user expands the results from one of the plot zeros). The specialized plots can be ranked based on the scores indicating most different to least different (over a threshold) from the plot zero. Redundancy can also be avoided As illustrated, instead of all plots being provided as a result, in the "outlier" mode, plots which are outliers from the plot zero for each plot type are shown. It can be inferred that remaining plots are not very different from plot zero. Of course, because the other plots exist, they can be made available to the user when requested. The outlier plots described above can be considered "vertical outliers."

"Horizontal outliers" can also be provided. For horizontal outliers, plots which are over slices that are different only on one attribute are compared. For example, P=plot(Salary, Education_Years) for Profession='Real Estate Agent' and State='NJ' can be horizontally compared with all plots where State is changed but profession remains the same or where State remains the same, but profession changes. Again, the focus is on outlier. Results can show whether P is an outlier when the profession is varied (e.g., whether real estate agent profession has different salary-years of education dynamics in NJ than other professions) or whether P is an outlier when the State is varied (e.g., whether NJ is a state which affects the real estate agent profession salary-years of education relationship in different ways than other states. If this is the case for one or more of dimensions of the slice, a horizontal outlier score can be assigned for that dimension.

In some cases, each plot can be assigned multiple scores including a vertical outlier score and a horizontal outlier score. Accordingly, relative scores are provided to measure and reward variability, diversification etc.

Figure 8:
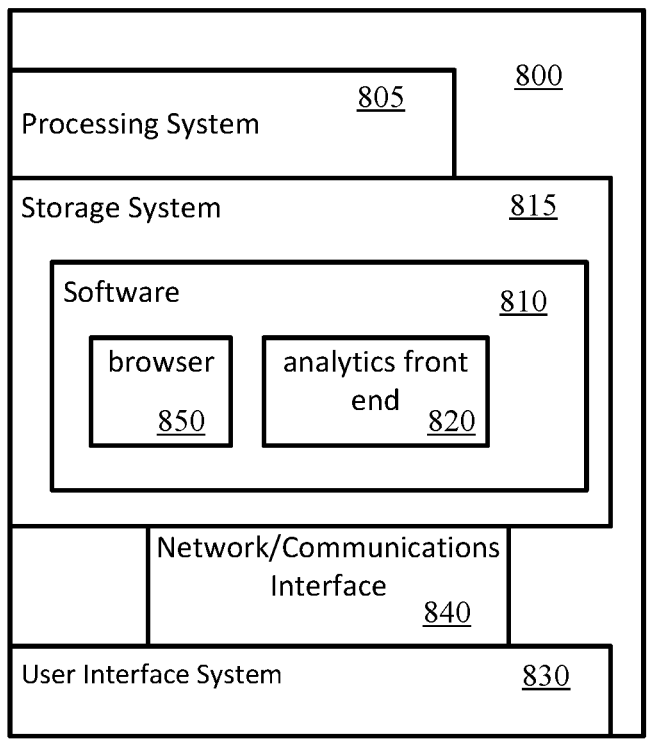
FIG. 8 illustrates components of a computing device that may be used in certain implementations described herein.

FIG. 8 illustrates components of a computing device that may be used in certain implementations described herein. Referring to FIG. 8, system 800 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, or a smart television. Accordingly, more or fewer elements described with respect to system 800 may be incorporated to implement a particular computing device.

System 800 includes a processing system 805 of one or more processors to transform or manipulate data according to the instructions of software 810 stored on a storage system 815. Examples of processors of the processing system 805 include general purpose central processing units, application specific processors, and logic devices, as well as any other type of processing device, combinations, or variations thereof. The processing system 805 may be, or is included in, a system-on-chip (SoC) along with one or more other components, such as network connectivity components, sensors, and video display components.

The software 810 can include an operating system and application programs, such as web browsers 850, search applications, and graph applications, any or all of which may be part of analytics front end 820.

Storage system 815 may include volatile and nonvolatile memory, and removable and non-removable media implemented in any method or technology for storage of information, such as computer readable instructions, data structures, program modules, or other data. Examples of storage media of storage system 815 include random access memory, read only memory, magnetic disks, optical disks, CDs, DVDs, flash memory, magnetic cassettes, magnetic tape, magnetic disk storage or other magnetic storage devices, or any other suitable storage media. In no case is the storage medium a transitory propagated signal or carrier wave.

Storage system 815 may be implemented as a single storage device but may also be implemented across multiple storage devices or sub-systems co-located or distributed relative to each other. Storage system 815 may include additional elements, such as a controller, capable of communicating with processing system 805.

The system 800 can further include user interface system 830, which may include input/output (I/O) devices and components that enable communication between a user and the system 800. User interface system 830 can include input devices such as a mouse, a track pad, a keyboard, a touch device for receiving a touch gesture from a user, a motion input device for detecting non-touch gestures and other motions by a user, a microphone for detecting speech, and other types of input devices and their associated processing elements capable of receiving user input.

The user interface system 830 may also include output devices such as display screen(s), speakers, haptic devices for tactile feedback, and other types of output devices. In certain cases, the input and output devices may be combined in a single device, such as a touchscreen display which both depicts images and receives touch gesture input from the user. A touchscreen (which may be associated with or form part of the display) is an input device configured to detect the presence and location of a touch. Visual output may be depicted on the display in myriad ways, presenting graphical user interface elements, text, images, video, notifications, virtual buttons, virtual keyboards, or any other type of information capable of being depicted in visual form.

The user interface system 830 may also include user interface software and associated software (e.g., for graphics chips and input devices) executed by the OS in support of the various user input and output devices. The associated software assists the OS in communicating user interface hardware events to application programs using defined mechanisms. The user interface system 830, including user interface software, may support a graphical user interface, a natural user interface, or any other type of user interface. For example, the interfaces for the search and visualization described herein, such as with respect to computing device 180 of FIG. 1 may be presented through user interface system 830.

Communications interface 840 may include communications connections and devices that allow for communication with other computing systems over one or more communication networks. Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are generally controlled by the OS, which informs applications of communications events when necessary.

Figure 9:
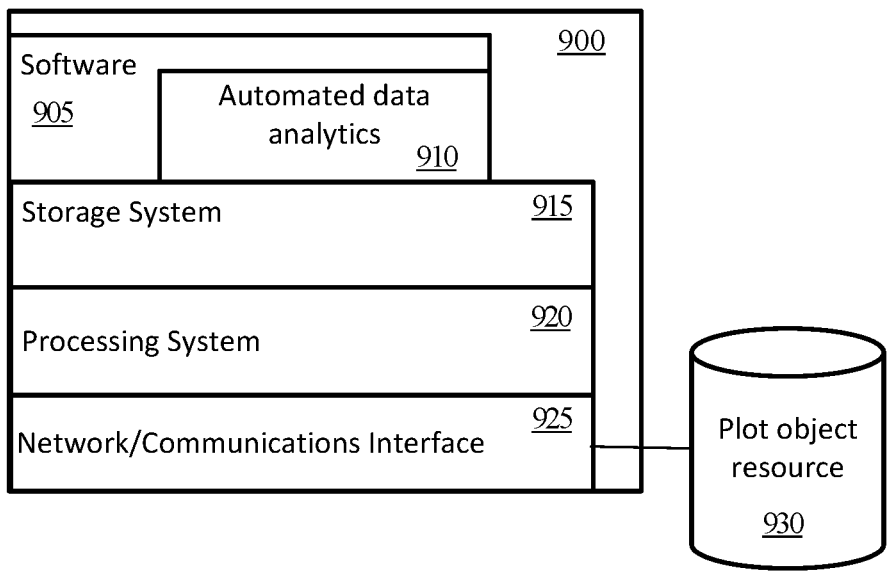
FIG. 9 illustrates components of a computing system that may be used to implement certain methods and services described herein.

FIG. 9 illustrates components of a computing system that may be used to implement certain methods and services described herein. Referring to FIG. 9, system 900 may be implemented within a single computing device or distributed across multiple computing devices or sub-systems that cooperate in executing program instructions. The system 900 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures, such as a Symmetric Multi-Processing (SMP) architecture or a Non-Uniform Memory Access (NUMA) architecture.

The system 900 can include a processing system 920, which may include one or more processors and/or other circuitry that retrieves and executes software 905 from storage system 915. Processing system 920 may be implemented within a single processing device but may also be distributed across multiple processing devices or sub-systems that cooperate in executing program instructions. Examples of processing system 920 include general purpose central processing units, application specific processors, and logic devices, as well as any other type of processing device, combinations, or variations thereof. The one or more processing devices may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general-purpose CPU.

Storage system 915 may include volatile and nonvolatile memory, removable and non-removable media implemented in any method or technology for storage of information, such as computer readable instructions, data structures, program modules, or other data. Examples of storage media include random access memory, read only memory, magnetic disks, optical disks, CDs, DVDs, flash memory, virtual memory and non-virtual memory, magnetic cassettes, magnetic tape, magnetic disk storage or other magnetic storage devices, or any other suitable storage media. In no case is the storage medium of the storage system 915 a transitory propagated signal or carrier wave.

Storage system 915 may be implemented as a single storage device but may also be implemented across multiple storage devices or sub-systems co-located or distributed relative to each other. Storage system 915 may include additional elements, such as a controller, capable of communicating with processing system 920.

In some cases, storage system 915 includes data resource 930. In other cases, the data resource 930 is part of a separate system with which system 900 communicates, such as a remote storage provider. Such remote storage providers might include, for example, a server computer in a distributed computing network, such as the Internet. They may also include "cloud storage providers" whose data and functionality are accessible to applications through OS functions or APIs. Data resource 930 may store the plot objects and provide a plot object resource 170 as described with respect to FIG. 1. In some cases, data resource 930 may include data described as being stored as part of data resource 120 of FIG. 1.

Software 905 may be implemented in program instructions and among other functions may, when executed by system 900 in general or processing system 920 in particular, direct the system 900 or processing system 920 to operate as described herein for automated data analytics 910 and corresponding services and optional application programming interface.

Software 905 may also include additional processes, programs, or components, such as operating system software or other application software. It should be noted that the operating system may be implemented both natively on the computing device and on software virtualization layers running atop the native device operating system (OS). Virtualized OS layers, while not depicted in FIG. 9, can be thought of as additional, nested groupings within the operating system space, each containing an OS, application programs, and APIs. Software 905 may also include firmware or some other form of machine-readable processing instructions executable by processing system 920.

System 900 may represent any computing system on which software 905 may be staged and from where software 905 may be distributed, transported, downloaded, or otherwise provided to yet another computing system for deployment and execution, or yet additional plotting.

In embodiments where the system 900 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 925 may be included, providing communication connections and devices that allow for communication between system 900 and other computing systems (not shown) over a communication network or collection of networks (not shown) or the air.

Embodiments of the described systems and techniques may be implemented as a computer process, a computing system, or as an article of manufacture, such as a computer program product or computer-readable medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process. As used herein, in no case does the term "storage media" consist of transitory propagating signals.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A computer-implemented method comprising:
  receiving a request for plots of a specified criteria;
  searching a plot object resource for plot objects describing plots relevant to the specified criteria, the plot object resource comprising an indexed repository of available plots including pre-generated plots;
  applying scores to each plot based on information theoretic metrics relevant to a measure of interest such that each plot has an associated score, wherein the information theoretic metrics relevant to the measure of interest comprise stability and diversity of a set of plots of a given plot type, wherein the stability of the set of plots indicates an extent that a change in a parameter value of an attribute of a given dataset causes changes between plots for the given dataset in the set of plots and wherein the diversity indicates an extent of differences between plots within the set of plots;
  sorting and ranking the plots according to the associated scores; and
  providing plots satisfying a criteria of the sorting and the ranking to a source of the request.

2. The method of claim 1, wherein the information theoretic metrics relevant to the measure of interest involve a function of distance between at least two plots.

3. The method of claim 1, further comprising reducing redundancy of the plots provided to satisfy the criteria of the sorting and the ranking.

4. The method of claim 3, wherein the reducing of the redundancy of the plots comprises:

applying measures of distance between plots such that similar plots are scored lower than plots that are more different.

5. The method of claim 1, further comprising:
applying measures of distance between the plot and other plots such that similar plots are scored lower than plots that are more different.

6. The method of claim 1, further comprising:
applying measures of distance between the plot and a plot zero, wherein the plot zero is a particular plot with particular attributes for a particular plot type over a whole data set.

7. The method of claim 6, wherein the plot is a plot of a same type as the plot zero but over a particular cube of data within the whole data set.

8. The method of claim 1, wherein the applying of the scores to each plot is performed asynchronously to the searching of the plot object resource.

9. The method of claim 1, wherein the applying of the scores to each plot is performed before receiving the request for plots or plot types of a specified criteria.

10. The method of claim 1, further comprising:
automatically generating plots from a data set; and
storing plot objects representing the plots in the plot object resource with associated scores.

11. The method of claim 10, wherein generating plots from the data set comprises:
generating bar graphs, histograms, heat maps, scatterplots, and box plots.

12. The method of claim 10, wherein generating plots from the data set comprises:
slicing the data set into cubes; and
generating plots for variables within each cube.

13. The method of claim 12, wherein slicing the data set into cubes comprises traversing the data set breadth first or depth first.

14. The method of claim 12, wherein the cubes comprise attributes which belong to multiple tables or aggregates of the attributes which belong to multiple tables.

15. The method of claim 12, further comprising:
reducing a number of cubes from which the plots are generated before generating the plots for the variables within each cube.

16. The method of claim 15, wherein the reducing of the number of cubes from which the plots are generated comprises:
performing an apriori algorithm with pruning by minimum support.

17. The method of claim 12, wherein the generating the plots for variables within each cube comprises:
generating univariate plots for the variables within each cube.

18. The method of claim 12, wherein the generating of the plots for variables within each cube comprises:
generating bivariate plots for the variables within each cube.

19. The method of claim 12, wherein applying the scores to each plot comprises analyzing plot types over a set of cubes to assign the scores to each plot type.

20. The method of claim 1, further comprising:
receiving one or more plots from a plot generator or via an application programming interface;
scoring the one or more plots; and
storing plot objects representing the one or more plots in the plot object resource with associated scores.

21. One or more computer-readable storage media having instructions stored thereon, that when executed by a computing device, direct the computing device to at least:
apply scores to each plot in a plot object resource based on information theoretic metrics relevant to a measure of interest such that each plot has an associated score, wherein the information theoretic metrics relevant to the measure of interest comprise stability and diversity of a set of plots of a given plot type, wherein the stability of the set of plots indicates an extent that a change in a parameter value of an attribute of a given dataset causes changes between plots for the given dataset in the set of plots and wherein the diversity indicates an extent of differences between plots within the set of plots;
receive a request for plots;
formulate one or more queries from the request;
search the plot object resource using the one or more queries to obtain results comprising relevant plots and scores associated with each of the relevant plots;
rank the results using the scores; and
provide the ranked results.

22. The media of claim 21, wherein the instructions to formulate one or more queries from the request direct the computing device to formulate queries in a form of:
number (NUM) vs NUM by category (CAT), NUM by CAT, or CAT by CAT, with optional one or more data attributes, where NUM and CAT are attribute types.

23. The media of claim 21, wherein the instructions to rank the results using the scores direct the computing device to rank individual plots of the relevant plots by their corresponding scores.

24. The media of claim 21, wherein the instructions to rank the results using the scores direct the computing device to rank plot types of the relevant plots by their corresponding scores.

25. A system for data exploration of multidimensional data sets, comprising:
a processing system; and
one or more computer-readable storage media having instructions stored thereon, that when executed by the processing system, direct the system for data exploration of multidimensional data sets to at least:
apply scores to each plot in a plot object resource at least in part according to relative measures with respect to other plots, wherein the relative measures comprise stability and diversity between plots of a given plot type, wherein the stability of a set of plots indicates an extent that a change in a parameter value of an attribute of a given dataset causes changes between plots for the given dataset in the set of plots and wherein the diversity indicates an extent of differences between plots within the set of plots;
receive a request for plots;
formulate one or more queries from the request;
search the plot object resource using the one or more queries to obtain results comprising relevant plots and scores associated with each of the relevant plots;
rank the results using the scores; and
provide the ranked results.

* * * * *